United States Patent [19]

Bell, Jr. et al.

[11] Patent Number: 4,601,491
[45] Date of Patent: Jul. 22, 1986

[54] PIPE CONNECTOR

[75] Inventors: James L. Bell, Jr., Oak View; Mark T. Thatcher, Ojai, both of Calif.; Brian K. Phillips; Norman Brammer, both of Aberdeen, Scotland; Thomas F. Sweeney, Ventura, Calif.

[73] Assignee: Vetco Offshore, Inc., Ventura, Calif.

[21] Appl. No.: 543,590

[22] Filed: Oct. 19, 1983

[51] Int. Cl.⁴ ............................................. F16L 35/00
[52] U.S. Cl. ...................................... 285/24; 285/334; 285/381; 285/921
[58] Field of Search ................ 285/333, 334, 381, 24, 285/27, DIG. 22; 29/447, 520

[56] References Cited

U.S. PATENT DOCUMENTS

| 750,565 | 1/1904 | Austin . | |
|---|---|---|---|
| 2,147,343 | 2/1934 | Hokanson . | |
| 3,109,672 | 11/1963 | Franz . | |
| 3,114,566 | 12/1963 | Coberly et al. | 285/381 X |
| 3,586,353 | 6/1971 | Lorenz | 285/334 |
| 4,124,232 | 11/1978 | Ahlstone | 285/381 X |
| 4,298,221 | 11/1981 | McGugan | 285/381 X |
| 4,410,204 | 10/1983 | Reimert | 285/334 X |

FOREIGN PATENT DOCUMENTS

| 1141071 | 8/1957 | France . | |
|---|---|---|---|
| 2064041 | 6/1981 | United Kingdom | 285/334 |
| 2113335 | 8/1983 | United Kingdom | 285/381 |

Primary Examiner—Dave W. Arola
Attorney, Agent, or Firm—Edward L. Kochey, Jr.

[57] ABSTRACT

A pipe connector with helically threaded (49, 57) frustoconical pin (10) and box (30) surfaces. The connector is axially (78) snapped together, but is rotated for disengagement. Centralizing surfaces (150, 152) on each thread form abut opposing crests (62, 54) to maintain concentrically, thereby detering disengagement under bending moments.

14 Claims, 17 Drawing Figures

PIPE CONNECTOR

BACKGROUND OF THE INVENTION

The invention relates to pipe connectors, and in particular, to releasable connectors for which rotation during assembly is difficult, such as piles, risers and conductors used for offshore oil production.

In driving of pilings for offshore platforms, pipe in the order of 30 inches in diameter is used in joints about 50 feet long. As the string is driven, additional joints are added at the top. The connection between joints should effectively transmit the pile driving forces and adequately handle the bending moments and rebound forces.

Risers and conductors, usually in the 20 inch to 30 inch diameter range, and in joints about 50 feet long are sometimes pile driven. They must reliably support tension placed on them when tensioning or running the string during drilling and producing operations. They must also tolerate high bending forces caused, for instance, by ocean currents.

Each of the above situations has in common the difficulty in making up the joints. Wave motion and wind create continuous movement, especially when work is carried out from a work boat. Equipment to facilitate the operation may not be available at this time. Welding is time consuming, and presents a fire hazard. Rotated threaded connectors are difficult to accurately align, and it is often difficult to obtain the high torque required to make up these connectors. With the large diameter and heavy joints, slight misalignment can cause cross-threading or jamming of the threads.

Stab type joints with latching dogs are relatively expensive. Other snap connectors cannot be readily disassembled.

SUMMARY OF THE INVENTION

A releasable pipe connector which is circumferentially oriented and axially snapped together. The connector may be rotated for disassembly and may be easily manufactured.

The connector comprises a cylindrical pin and box each having frustoconical surfaces which are telescopically engageable. Helical thread forms on each of the pin and box have crests of discreet axial length, rounded roots, and an abutting flank facing away from the open end. The pin and box each have a secondary radially extending surface facing toward the open end. In a preferred embodiment this is the shoulder of one member, and an abutting surface on the other. There are means for circumferentially aligning the pin and box for direct stabbing so that when the pin and box are fully engaged, both the abutting flanks of the pin and box as well as the secondary extending surfaces are in axially compressive abutment.

The lengths of crests are related to the overlap and the frustoconical taper, so that when stabbing occurs in the properly aligned position, initial contact is made between the crests. When the joint is further compressed together, the box expands and the pin compresses while the crests ride over one another, snapping into place beyond the crest contact point.

A double start thread form is arranged so that the crest surfaces between the two starts are of different axial lengths, thereby providing the ability to slide on the crest surfaces over both threads while engaging only in one. A preferred means for aligning a connector involves a slot in the box member with an alignment key secured to the pin member. This is arranged to permit relative axial motion but to prevent rotation. The key may be removed to permit disassembly of the joint.

There may be also included a centralizing surface in each thread form. This is located between crests and intermediate the radial dimension of the crest surface and the root. These surfaces are in contact after the joint has been snapped together and are preferably in force fit contact.

The connector may be easily manufactured since helical threads are easy to machine with precision. With proper alignment, the crest surfaces first make contact, with the box expanding and the pin contracting, as the members are forced together. The connector may be designed to operate below the elastic limit of the materials, or it may be designed to operate beyond the elastic limit where a more consistent reliable tooth engagement is achieved, at the expense of higher stabbing forces.

Where an axially preloaded joint is desired, a slight angle is included between the thread flank and the other abutting surface so that the radial movement of the connectors toward their original size operates against the flank to axially preload the connector.

The centralizing surface is provided to avoid the possibility that the teeth on one side overengage when bending is applied to the connector. Overengagement on one side tends to result in insufficient engagement on the opposite side and possible zippering action or inadvertent release of the connector.

BRIEF DESCRIPTION OF THE DRAWINGS

FIG. 2 is a sectional elevation of one thread form, while

DESCRIPTION OF THE PREFERRED EMBODIMENT

Figure 1:
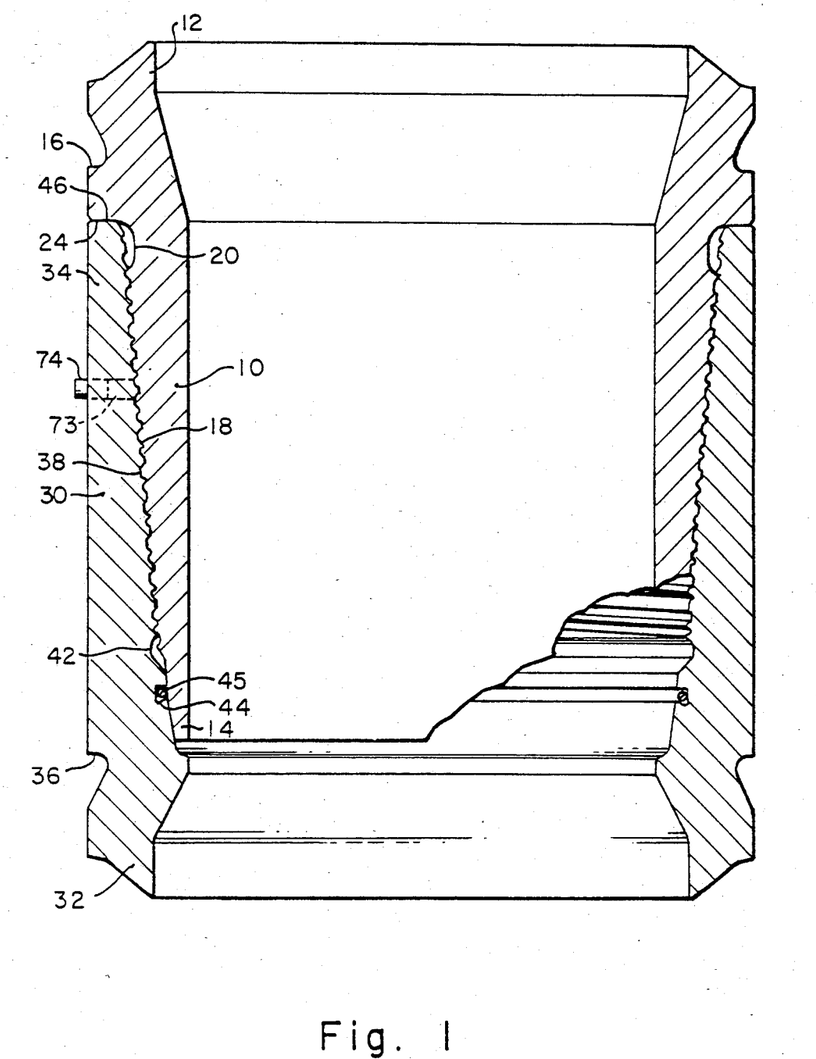
FIG. 1 is a general arrangement of the connector showing the pin and box and the frustoconical surface.

Referring to FIG. 1, the cylindrical pin 10 has a first end 12 securable by welding to a pipe (not shown), and an open end 14. A loading shoulder 16 is provided to engage the pin for axially clamping. The pin includes a frustoconical outer surface 18 with a stress relief groove 20 located at one end. The pin also includes shoulder 24 in the form of radially extending surface facing toward the open end 14.

A cylindrical box 30 has a first end 32 securable to a pipe (not shown), and a second open end 34. The box also includes a loading shoulder 36 for axially clamping the box, and a frustoconical inner surface 38. It includes a stress relief groove 42 and a seal ring groove 44. An "O" ring seal 45 is located in this groove. The box also has an end surface 46 in the form of a radially extending surface facing the open end 34. Clamps (not shown) are used to supply the required axial stabbing force, and then removed.

Figure 2:
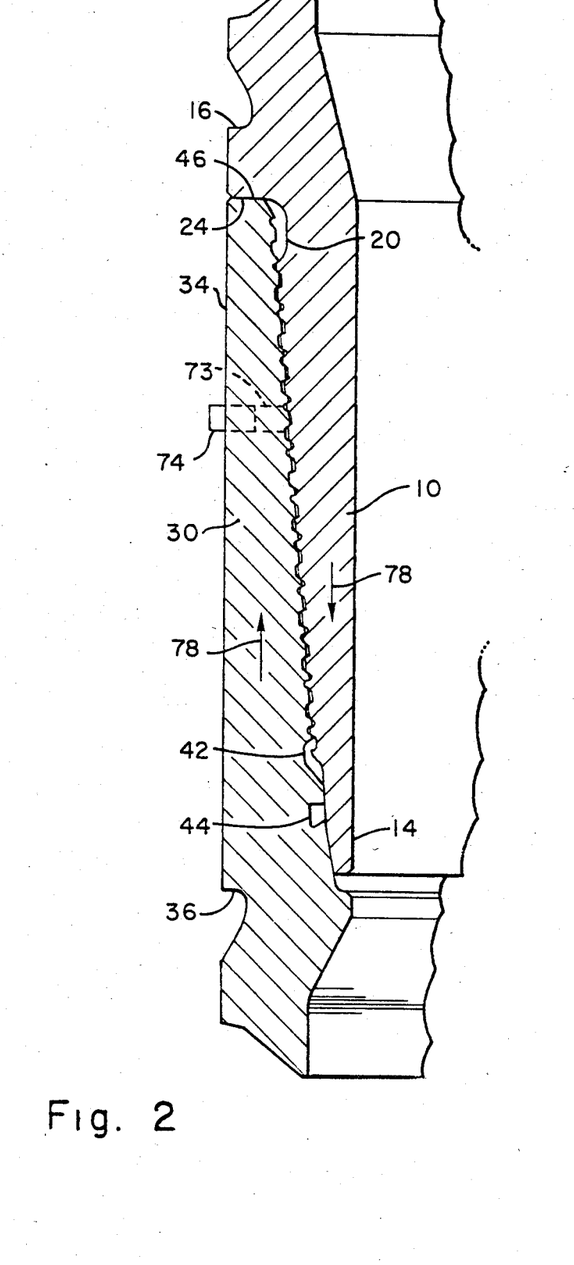

Referring now to FIG. 2, the helical thread form is shown in detail. The thread is shown in its engaged position in FIGS. 2 and 2d. Pin 10 has multiple start threads which in this case are 180 degrees apart. A first thread with a narrow groove 50 and a second with a wide groove 52 result in alternate crest surfaces 54 and 56, having different axial extents, crest 54 being wide, and crest 56 being narrow. Similarly, the box 30 has a dual start thread form 57 with narrow groove 58 and wide groove 60 producing a wide crest 62 and a narrow crest 63. Pin thread form 49 includes flanks 64 facing away from the open end of the pin. The edges 66 of the flank and the crest should be as sharp as possible since rounding these edges decreases the amount of load bearing surface of flank 64. The grooves 50 and 52 are rounded at the root as shown at 68 to enhance the fatigue life of the connector by reducing stress concentrations at small root radii.

Similarly, the box 30 has flanks 70 facing away from the open end of the box. The roots or grooves 60 and 58 also are rounded 72. The box 30 may also include a threaded opening 73 with plug 74. This permits injection of a fluid under pressure injection for the purpose of reducing the torque required to break the connector loose.

The term overlap is used to describe the dimensional difference between corresponding radii of crests such as 56 and 63 with the pin and box in the "as fabricated" condition. This is prior to assembly with both components in the unstressed condition. After assembly, the corresponding distance 76 is the tooth engagement, representing the distance of engagement of flanks 64 and 70. This tooth engagement will be less than the overlap when shrink fit is obtained, with strain locked in the pin and box.

If the pin and/or box exceed the elastic limit during assembly they would be permanently changed in size. The term residual overlap is used to describe the dimensional difference between corresponding radii of crests such as 56 and 63 if the components were allowed to go to the unstressed condition after assembly. If the elastic limit were not exceeded during installation then the overlap and residual overlap would be identical. If, however, the elastic limit is exceeded, then the residual overlap would be less than the initial overlap.

The angle of the flanks 64 and 70 with respect to shoulder 24 and to box end 45 are each 12° and preferably within the range of 0° to 20°. As the pin and box attempt to restore themselves to the unstressed condition the abutting flanks 64 and 70 cooperate along with complimentary pin and box surfaces 24 and 45 to provide an axial load on the pin and box, compressing the box end against pin shoulder 24. For pile driving, it is important that the connector be snug and for bending some preload is to be preferred. Accomplishment of preload is a function of the difference between the tooth engagement and residual overlap, this representing the residual strain and concomitant stress existing in the box and pin. The amount of the preload is a function of the included angle.

Figure 2A:
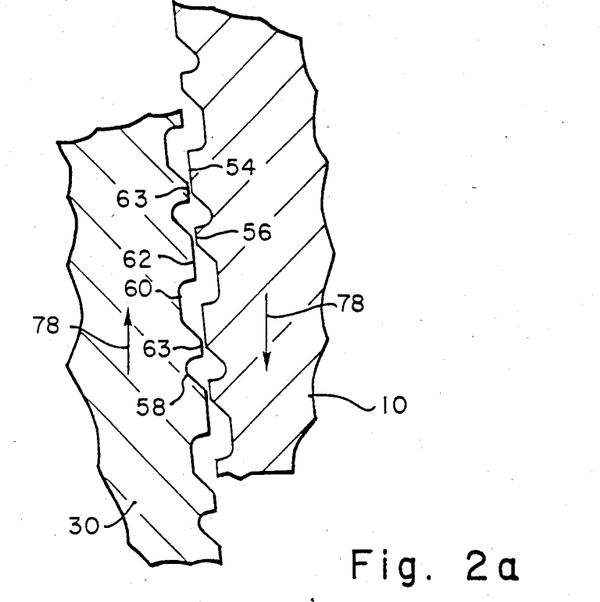
FIGS. 2a, 2b, 2c and 2d are details of the interengaging helical thread form during engagement and at the engaged position.

FIG. 2a illustrates the position of the pin 10 and box 30 during the stabbing operation as initial contact is made. The axial distance which the pin must travel into the box after contact and before shouldering is referred to as the standoff. It is determined by the amount of overlap and the taper angle. In order to avoid the possibility of a crest engaging a groove before shouldering occurs, the lead of the thread must be greater than the standoff. The crest width is then selected so that when stabbing occurs initial contact is made as illustrated between wide crest 54 and the narrow crest 63.

Figure 2B:
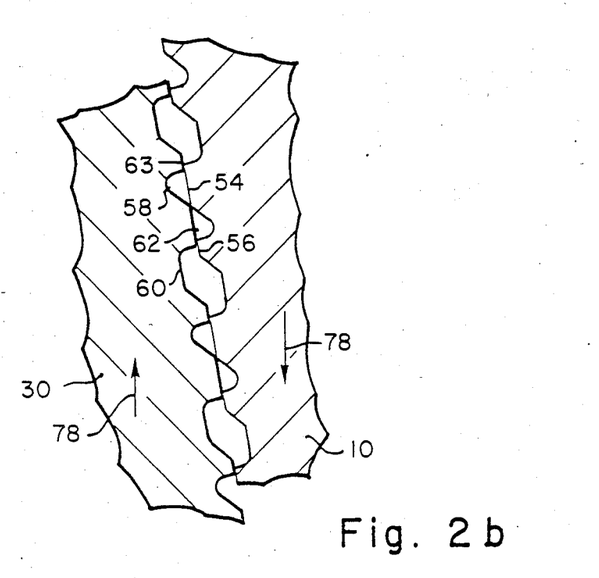

As stabbing continues in the direction shown by arrows 78, the wide crest 54 rides over narrow groove 58 so as to engage the following wide crest 62. This precludes premature engagement in the wrong thread of the thread form. This condition is illustrated in FIG. 2b.

Figure 2C:
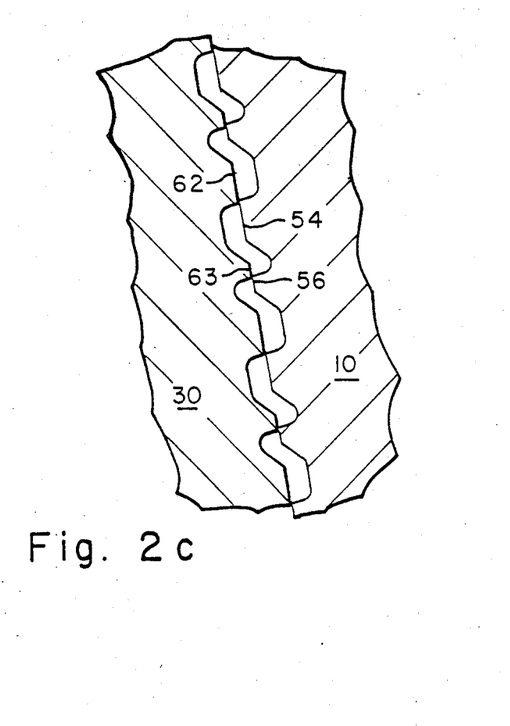
Figure 2D:
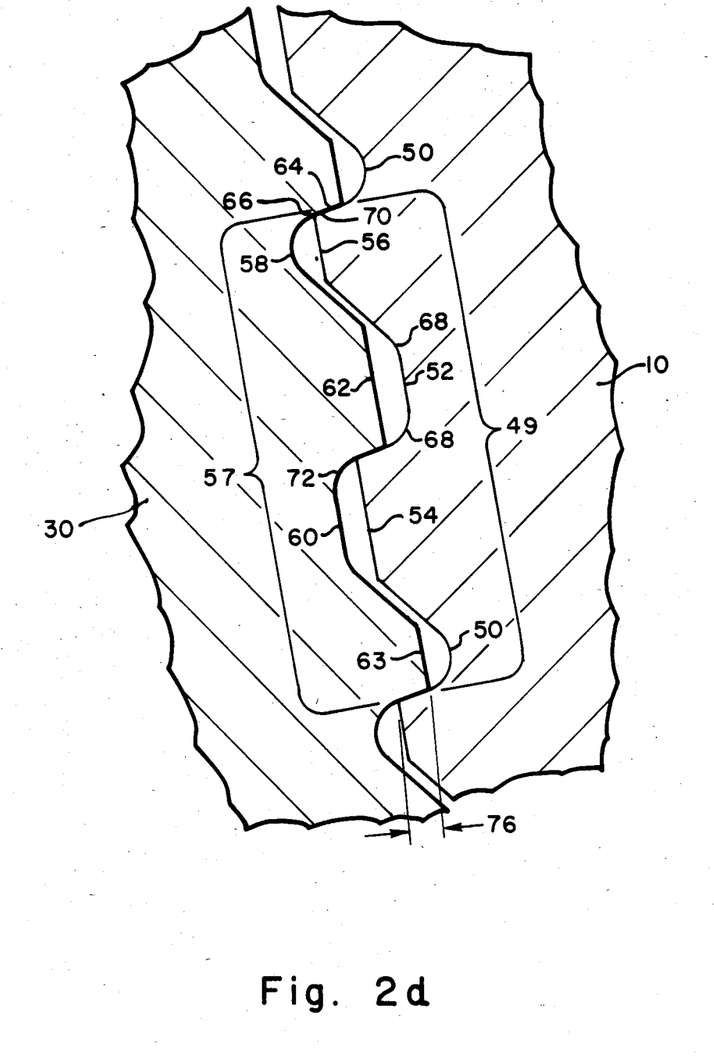

Stabbing continues with clamping force applied on the shoulders 16, 36 approaching the maximum strain condition illustrated in FIG. 2c just before the connector snaps together. Immediately after this, the connector snaps into the engaged position illustrated in FIG. 2d.

Figure 3:
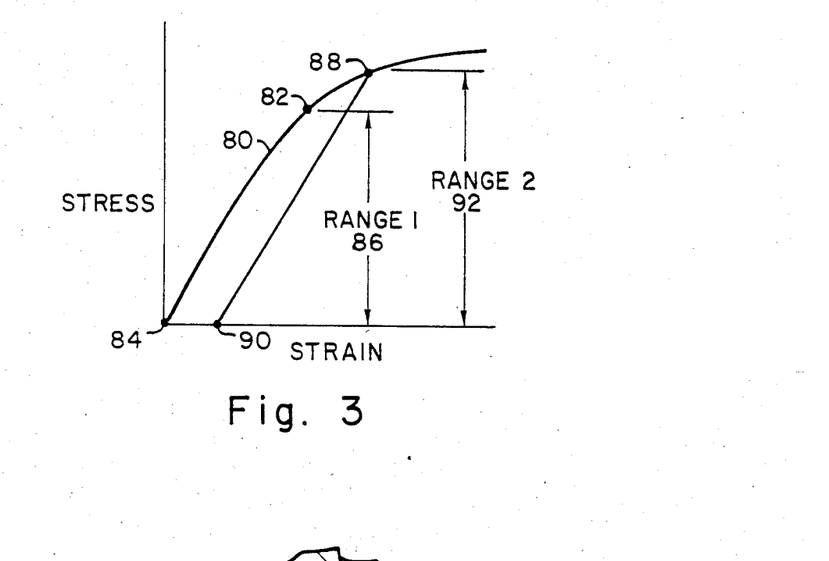
FIG. 3 is a stress/strain diagram which illustrates the elastic strain range.

FIG. 3 illustrates a typical stress/strain curve for steel. When operating along the stress/strain curve 80 below the elastic limit 82 the material will return when unstressed to its original condition 84. The difference in strain between points 82 and 84 may be considered the elastic strain range as indicated by 86.

If the elastic limit is exceeded, for instance, to point 88, the material will not return to its original condition, but will return to point 90 with a permanent residual strain in the material. The material now acts elastically throughout elastic strain range 92, representing the difference between points 88 and 90.

If the connector in its maximum strain condition, illustrated in FIG. 2c, has not exceeded the elastic limit 82, the residual overlap will be the same as the original overlap. Tooth engagement will approach this overlap as a maximum, when the residual radial strain on the pin and box reach zero. If the elastic limit is not reached, then the tooth engagement is reduced. If on the other hand, the maximum strain exceeds the elastic limit such as to point 88, then the full elastic range 92 will be available for contracting the connector box and expanding the pin. The effect of dimensional tolerances on preload and tooth engagement may be minimized by designing the connector so that the elastic limit is exceeded even when the overlap is at the minimum value permitted by dimensional tolerances. Accordingly, one may design the connector to operate in this condition exceeding the elastic limit.

Since the thread forms are helical there is only one circumferential relationship where the above described characteristics will be obtained. It accordingly is required to locate the proper circumferential alignment for aligning the connectors. The means for alignment may be as simple as marking on the outside of the pin and box, or may be the alignment key illustrated in FIG. 6.

Figure 4A:
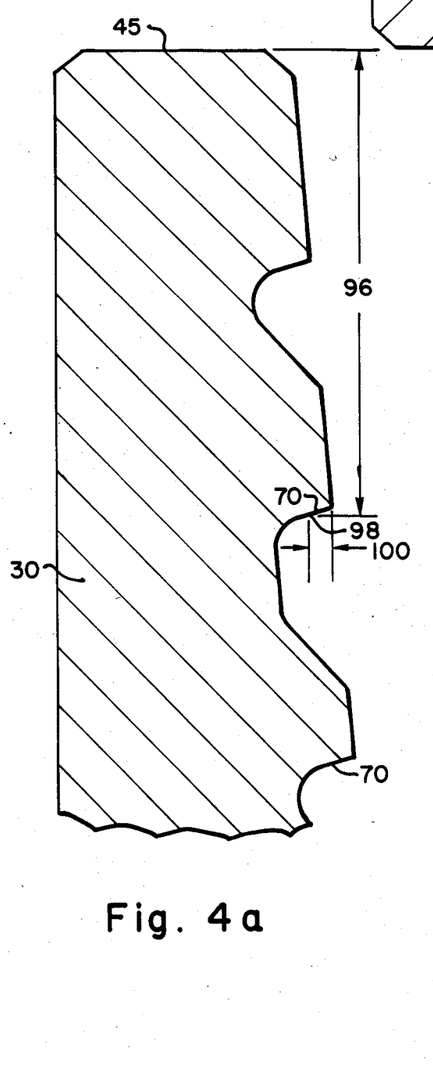
FIGS. 4a & 4b illustrate measurements to be made for providing proper alignment of the pin and box.
Figure 4B:
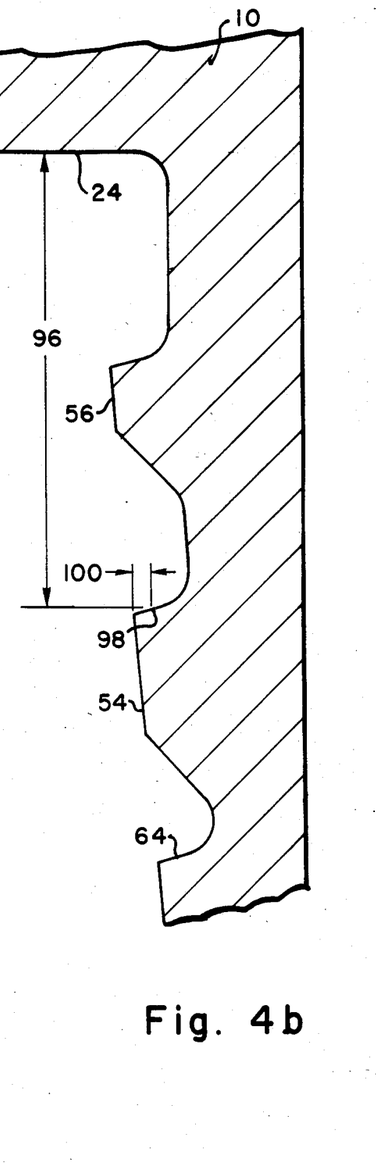

Since the operative portions of the connector are the flanks facing away from the open end of each of the pin and box, as well as the pin shoulder 24 and the box face 45, the preferred method of obtaining the orientation depends on measurements of these features. A selected dimension 96 is to be used for both the pin 10 and the box 30. The location around the circumference is determined where this dimension is a preselected value 96 on pin between shoulder 24 and measuring point 98. This measuring point is selected on the flank 64 facing away from the open end of the pin. The inward dimension 100 from the surface of crest 54 is selected as one-half of the desired tooth engagement. With this point located, a similar point is located on box 30 with the dimension being established between the pin end 45 and the corresponding engaging flank 64. The pin and box components are then either marked or machined in accordance with the measurements so that the located points are circumferentially aligned when the connector is to be stabbed together.

Figure 5A:
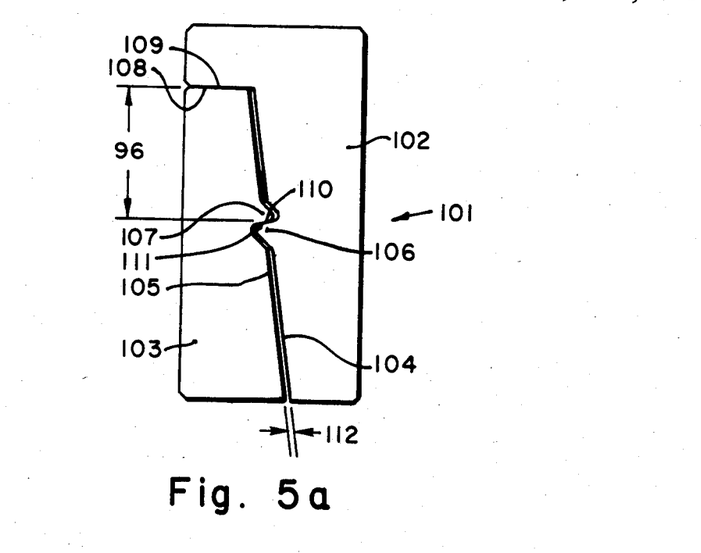
FIGS. 5a, 5b and 5c illustrate the gauge which may be employed for this purpose.
Figure 5B:
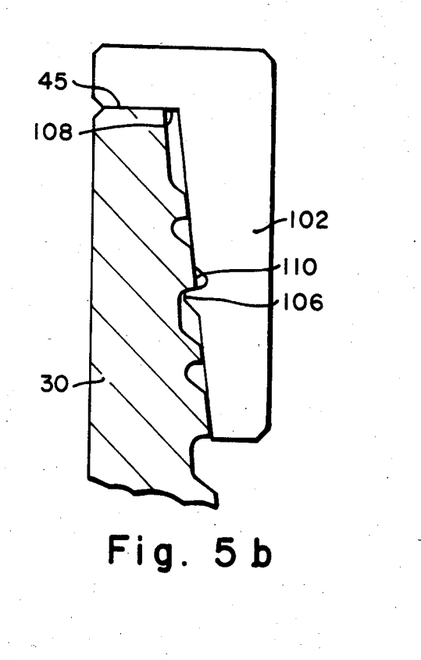
Figure 5C:
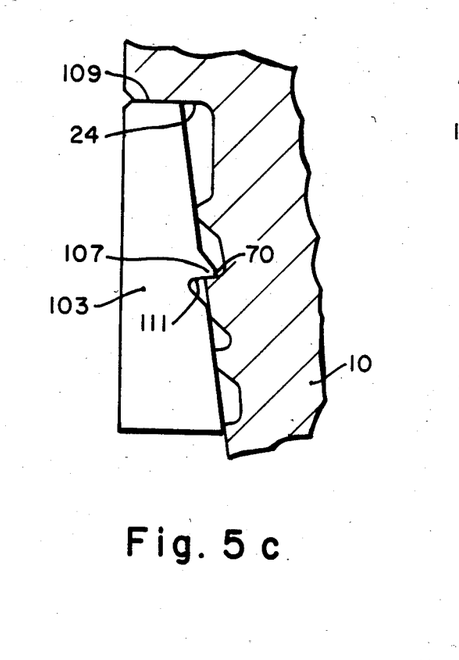

A typical gauge for this purpose is illustrated in FIGS. 5a, 5b and 5c.

Gauge set 101 consists of a box gauge 102 and a pin gauge 103 which are constructed from ⅛ inch thick tooling plate. The box and pin gauges have tapered mating surfaces 104 and 105 respectively, the taper matching the frustoconical taper 18, 38 of the connector. Tooth 106 on the box gauge and tooth 107 on the pin gauge are engageable at the predetermined distance 96 from shoulder surface 108 and face surface 109 of the gauges.

The use of the gauges is shown in FIGS. 5b and 5c. Referring to FIG. 5b, the shoulder 108 of the gauge 102 is held against the box face 45 with the mating surface 104 against the surface of crests 62 and 63. Holding the gauge parallel to the box axis it is moved circumferentially until flank 110 of tooth 106 contacts flank 70 of the box. The gauge location is then marked on the outside of the box.

Similarly in FIG. 5c, the face 109 of gauge 103 is held against the pin shoulder 24 with the mating surface 105 against the surface of crests 54 and 56. It is moved circumferentially until flank 111 of tooth 107 contacts flank 64 of the pin. This location is marked on the pin.

Calibration of the gauges may be checked by resting the gauges together as shown in FIG. 5a. They are correct if the gap 112 between mating surfaces 104 and 105 is equal to the desired engagement 76. This is the distance which the crest surfaces extend beyond each other when the predetermined distance 96 is held. It does not really matter what dimension 96 is, so long as it is the same for both gauges.

Figure 6:
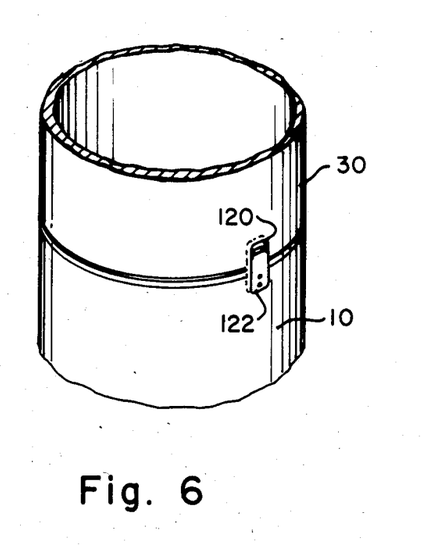
FIGS. 6 & 6a illustrate an alignment key.
Figure 6A:
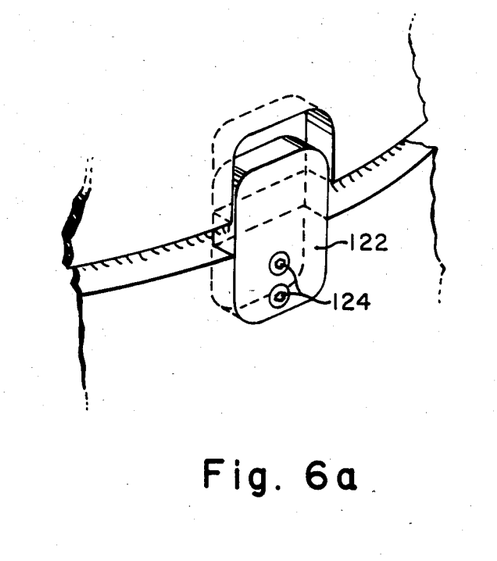

A preferred alignment means is shown in FIG. 6 with detail of the alignment key being shown in FIG. 6a. After the alignment is determined as described above, a slot 120 is machined in the box and an alignment key 122 is fastened to the pin with screws 124. This not only permits alignment of the pin and box for stabbing, but also operates as a guide to maintain this alignment during the clamping operation. The alignment key 122 also serves as an anti-rotation device to preclude any possibility of the connector rotating loose during operation. At the time it is desired to disassemble this joint, the alignment key is removed and the joint may be unscrewed.

The maximum tooth engagement is limited by the strain range of the material. With a 100,000 psi yield strength material, and a 30 inch diameter, it can be determined by using Young's modulus of $30 \times 10^6$ psi that the maximum elastic deflection is 0.1 inches on the diameter, which is 0.05 inches on each thread. This represents the maximum engagement that can reasonably be designed for. For the connector described here, it is recommended that a radial overlap of 0.04 inches and an engagement of 0.03 inches per thread be the design criteria, thereby providing some preload but still maintaining substantial thread engagement.

The connector, as described, can axially be stabbed together without rotation, using reasonable forces such as 300,000 pounds for a 30 inch outside diameter connector having a frustoconical taper of 4 degrees and the same taper on the crests. The connector may furthermore be disassembled by removing any locking key and rotating the members.

Seal ring 45 is intended as the primary seal for sealing the connector. When the connector is to be disassembled, it may be found to be too tight for rotation with available equipment. Hydraulic fluid may be injected under pressure through hole 73 to expand the box and contract the pin, as well as to supply lubrication. Since the pressure energization is only required to initially break the connector loose, leakage is not fatal to its performance.

Should the end abutting surface of either the pin or box be damaged and require dressing, the connector need not be destroyed but can be used by again measuring the threads to find a new circumferential orientation after such dressing operations. Furthermore, the connector has the possibility of being tightened by rotation should the initial installation result in a loose connector for any reason.

Figure 7:
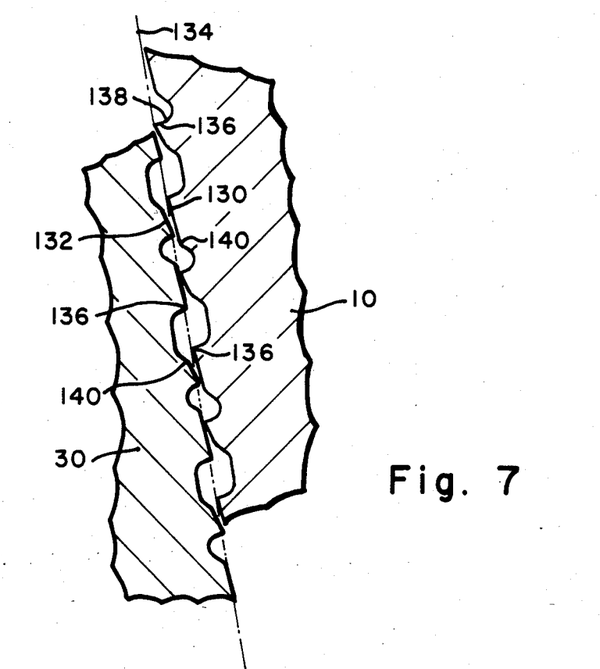
FIG. 7 illustrates a thread form where the taper of the crests are steeper than that of the frustoconical surface.

In the thread form illustrated in FIG. 7, the crests 130 and 132 have a steeper angle than that of the frustoconical surface 134. The edges 136 of the flanks 138 which are the load bearing flanks remain on the frustoconical surface. The leading edge 140 of each crest is, however, drawn back from the frustoconical surface to such an extent that it has a radial dimension substantially equal to that of the corner 136 of the adjoining crest. Accordingly, any crest cleared by the corner 136 will be engaged by the following crest 130, thereby, minimizing the possibility of engaging the flanks rather than the crests in the event of slight misalignment. Such a connector, however, will require more force to clamp it together, the force being approximately proportional to the tangent of the taper angle of the crest surfaces.

The connectors as described in this invention inherently have small tooth engagement. It has been found that under high bending loads, the teeth can disengage on the tension side of the connector. This appears to occur because shifting of the pin away from the tension side permits disengagement of these teeth. As can be seen by looking at the earlier described connector, wide crests such as 54 fit within wide grooves or roots 60. Since the abutting flanks 64 are highly loaded, it is required that these root surfaces be rounded and accordingly, they are inherently deeper than the engaging crests.

Figure 8:
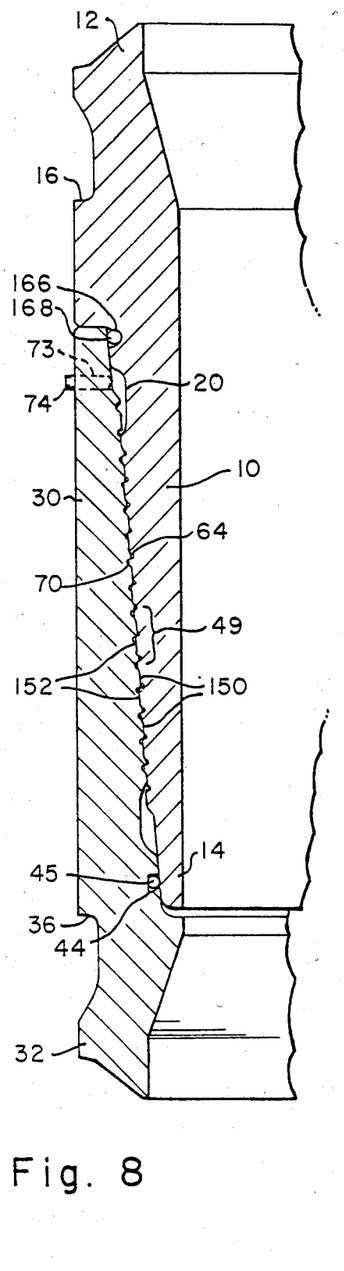
FIG. 8 illustrates a thread form having a centralizing surface.
Figure 9:
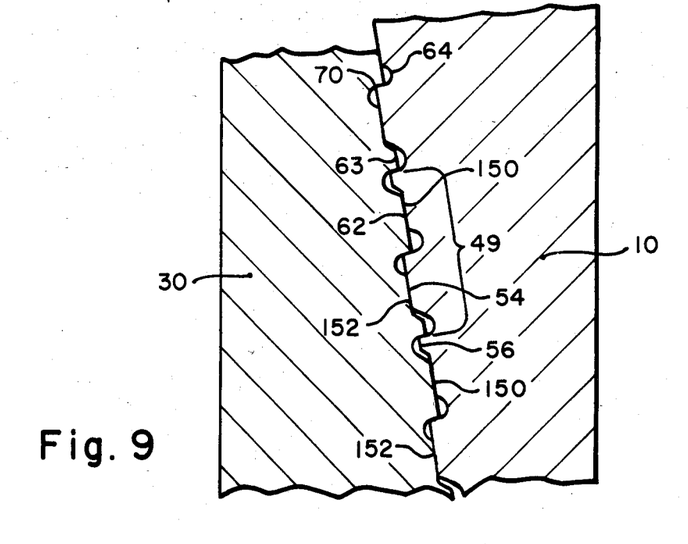
FIG. 9 is a detail of the thread form of FIG. 8.

Accordingly, an improved thread form is described and illustrated in FIGS. 8 and 9. This improved thread form essentially uses a portion of the deepened groove, so that material is retained in a portion thereof which abuts with the engaging crest. In FIG. 9 the narrow crests 56 and the wide crest 54 can be seen as well as the wide crests 62 and the narrow crests 63 on the box. The pin 10 has within thread form 49 an additional axially extending radially facing centralizing surface 150. Similarly, the box has such an axially extending radially facing surface 152. In each case, this surface is located between a wide and narrow crest at a radial dimension which is between that of the crest surface and that of the root surface.

On final snapping of the connector in place after stabbing, initial engaging action occurs between the opposing flanks 64 and 70. The radial contraction occurs however, only until centralizing surfaces 152 engage the crest 54 and centralizing surfaces 150 engage crest 62. The actual tooth engagement is accordingly the difference in radial dimension between the outer edge of the crest, immediately adjacent to the loaded flank and the diameter of the centralizing surface. These relative dimensions are easy to hold accurately. The centralizing surface operates to preclude the connector from drifting off center under load, whereby the teeth on the opposite side could be disengaged.

Furthermore, it is desirable that the connector be designed such that on stabbing an interference fit is achieved between the centralizing surface and the crest. This minimized the tendency of the box and pin to become oval under bending load. In the connector previously described, the potential tooth engagement was limited to 0.05 inches. Of this, it is recommended that a shrink fit be obtained such that 20% of this, i.e., 0.01 inches, is used for the shrink fit of the centralizing surface.

The connector of FIG. 8 has, in addition to seal groove 44 and seal ring 45, a seal groove 166 and seal ring 168 in pin 10. Threaded opening 73 with plug 74 is located near the stress relief groove 20. This avoids the possibility of the opening being blocked by a centralizing surface. Seal ring 168 improves sealing when the connector is pressure energized to start the release of the connector, and also operates as a backup seal.

Alignment of the connectors is based on axial measurement from the abutting shoulders to the thread form. Therefore, the radial strain of the connector, even though it may result in a permanent set, is not detrimental to the amount of engagement obtained. Since the circumferential orientation locates the thread forms at the proper axial distance from the shoulder the radial movement of the crest surfaces as the connector snaps into engagement is what produces the intended result.

We claim:
1. A snap connector for pipes comprising:
  a cylindrical pin having a frustoconical outer surface, one end thereof securable to a pipe, and the other end open;
  a cylindrical box having a frustoconical inner surface, one end securable to a pipe, the other end open, and telescopically engageable with said pin;
  a first helical thread form on the outer surface of said pin;
  a second helical thread form on the inner surface of said box;
  each of said thread forms having a crest of discreet axial length, a rounded root, and an abutting flank facing away from the open end, the surface of each of said crests being said frustoconical surface of said pin and said box respectively;
  each of said pin and box having a secondary radially extending surface facing toward the open end;
  means for circumferentially aligning said pin and box for correct axial stabbing, such that the distance from said secondary radially extending surface of said pin to a point on an abutting flank of said pin equals the distance from said secondary radially extending surface of said box to a point on an abutting flank of said box at the same axial and circumferential location, whereby when fully engaged both the abutting flanks of the pin and box and the secondary radially extending surfaces are in axially compressive abutment; and
  the width of said crests so related to the frustoconical taper that when stabbing in the circumferentially aligned position, initial contact is made radially between said crests of said first helical thread form and said crests of said second helical thread form, whereby the connector is forced into snap engagement without rotation.

2. A connector as in claim 1, wherein the included angle between said secondary abutting surface and said abutting flanks is not more than 12°.

3. A connector as in claim 1, wherein said alignment means comprises:
  a slot in one of said pin and box; and
  a removable pin secured to the other of said pin and box member and arranged to slide axially into said slot.

4. A connector as in claim 1:
  said helical thread forms comprising multiple start threads;
  the intermediate crests and corresponding grooves between said multiple start threads being of different axial length, whereby the thread forms are engageable only in one relationship with the multiple threads.

5. A connector as in claim 1:
  said helical crest surfaces having the same taper as the frustoconical surfaces.

6. A connector as in claim 1:
  an axially extending centralizer surface radially located between the crest and root of at least one of each of said thread forms; and
  said pin and box sized and aligned such that the centralizing surfaces contact the crest of the thread form of the opposing box or pin members in the overlap condition whereby said pin is precluded from drifting off center with respect to said box.

7. A connector as in claim 6:
  having said axially extending centralizing surface on each of said thread forms.

8. A connector as in claim 6, wherein said centralizing surfaces contact opposing crests with a shrink fit of greater than 10% of the elastic strain range of the pin and box material.

9. A connector as in claim 1:
  said pin and box aligned such that when fully engaged the surfaces are in shrink fit abutment.

10. A connector as in claim 1:
  said box having a radial opening therethrough, whereby fluid may be injected under pressure between the pin and box to aid in disassembly.

11. A snap connector for pipes comprising:
  a cylindrical pin having a frustoconical outer surface, one end thereof securable to a pipe, and the other end open;
  a cylindrical box having a frustoconical inner surface, one end securable to a pipe, the other end open, and telescopically engageable with said pin;
  a first substantially circumferential thread form on the outer surface of said pin;
  a second substantially circumferential thread form on the inner surface of said box;
  each of said thread forms having a crest of discreet axial length, a rounded root, and an abutting flank facing away from the open end;
  each of said pin and box having a secondary radially extending surfacing toward the open end;
  said pin and box alignable and dimensionally sized such that the distance from said secondary radially extending surface of said pin to a point on an abutting flank of said pin equals the distance from said secondary radially extending surface of said box to a point on an abutting flank of said box at the same axial and circumferential location, whereby, when fully engaged in the overlap condition both the abutting flanks of the pin and box and the secondary radially extending surfaces are in axially compressive abutment;

the length of said crests so related to the frustoconical taper that when stabbing initial contact is made between said crests;

an axially extending centralizer surface radially located between the crest and root of at least one of each of said thread forms; and said pin and box sized such that the centralizing surfaces contact the crest of the thread form of the opposing box or pin members in the overlap condition.

12. A connector as in claim 11:

having said axially extending centralizer surface on each of said thread forms.

13. A connector as in claim 12 wherein said centralizing surfaces contact opposing crests with a shrink fit of greater than 10% of the elastic strain range of the pin and box material.

14. A snap connector for pipes comprising:

a cylindrical pin having a frustoconical outer surface, one end thereof securable to a pipe, and the other end open;

a cylindrical box having a frustoconical inner surface, one end securable to a pipe, the other end open, and telescopically engageable with said pin;

a first helical thread form on the outer surface of said box;

a second helical thread form on the inner surface of said box;

each of said thread forms having a crest of discreet axial length, a rounded root, and an abutting flank facing away from the open end, the radial dimension of the edge toward the open end of each individual crest is not greater than the radial dimension of the largest radial dimension of the adjacent crest which is toward the open end, whereby any mating crest cleared by the adjacent crest during stabbing will be cleared by the edge of the corresponding individual crest;

each of said pin and box having a secondary radially extending surface facing toward the open end;

means for circumferentially aligning said pin and box for correct axial stabbing, such that the distance from said secondary radially extending surface of said pin to a point on an abutting flank of said pin equals the distance from said secondary radially extending surface of said box to a point on an abutting flank of said box at the same axial and circumferential location, whereby when fully engaged both the abutting flanks of the pin and box and the secondary radially extending surfaces are in axially compressive abutment; and the width of said crests so related to the frustoconical taper that when stabbing in the circumferentially aligned position, initial contact is made radially between said crests of said first helical thread form and said crests of said second helical thread form, whereby the connector is forced into snap engagement without rotation.

* * * * *